US012719377B2

(12) United States Patent
Chou et al.

(10) Patent No.: US 12,719,377 B2
(45) Date of Patent: Aug. 25, 2026

(54) LLC RESONANT CONVERTER AND CONTROL METHOD THEREOF

(71) Applicant: Leadtrend Technology Corporation, Zhubei City (TW)

(72) Inventors: Kuan Hsien Chou, Zhubei City (TW); Yao Tsung Chen, Zhubei City (TW)

(73) Assignee: LEADTREND TECHNOLOGY CORPORATION, Zhubei City (TW)

( * ) Notice: Subject to any disclaimer, the term of this patent is extended or adjusted under 35 U.S.C. 154(b) by 165 days.

(21) Appl. No.: 18/909,105

(22) Filed: Oct. 8, 2024

(65) Prior Publication Data

US 2025/0211123 A1 Jun. 26, 2025

(30) Foreign Application Priority Data

Dec. 21, 2023 (TW) ................................ 112150100

(51) Int. Cl.
*H02M 3/335* (2006.01)
*H02M 3/00* (2006.01)

(52) U.S. Cl.
CPC ......... *H02M 3/33571* (2021.05); *H02M 3/01* (2021.05)

(58) Field of Classification Search
CPC ............................ H02M 3/33571; H02M 3/01
See application file for complete search history.

(56) References Cited

U.S. PATENT DOCUMENTS

| | | | | |
|---|---|---|---|---|
| 2018/0062527 | A1* | 3/2018 | Lu | H02M 3/18 |
| 2019/0238048 | A1* | 8/2019 | Chou | H02M 1/32 |
| 2020/0036290 | A1* | 1/2020 | Yang | H02M 3/24 |
| 2020/0091827 | A1* | 3/2020 | Chen | H02M 3/33569 |
| 2020/0106368 | A1* | 4/2020 | Chen | H02M 3/33523 |
| 2021/0305888 | A1* | 9/2021 | Chen | H02M 1/08 |
| 2021/0376714 | A1* | 12/2021 | Tsou | G01R 19/175 |

* cited by examiner

*Primary Examiner* — Rafael O De Leon Domenech
(74) *Attorney, Agent, or Firm* — McClure, Qualey & Rodack, LLP

(57) ABSTRACT

Provided in an embodiment is a control method in use of an LLC converter with high-side and low-side switches connected in series between two input power lines via a first node. Connected to the first node is a resonant circuit with a primary winding of a transformer and a resonant capacitor both connected to a second node, to which a voltage divider is connected to generate a feedback signal at a feedback node. First and second control signals are generated to control the high-side and low-side switches respectively in response to the feedback signal and a compensation signal controlled by an output voltage of the LLC converter. A first duty cycle of the first control signal is compared with a second duty cycle of the second control signal to provide an accumulation signal, in response to which an adjustment current is provided to adjust an average of the feedback signal.

15 Claims, 3 Drawing Sheets

LLC RESONANT CONVERTER AND CONTROL METHOD THEREOF

CROSS-REFERENCE TO RELATED APPLICATION

This application claims priority to and the benefit of Taiwan Application Series Number 112150100 filed on Dec. 21, 2023, which is incorporated by reference in its entirety.

BACKGROUND

The present disclosure relates generally to LLC converters, and more particularly to apparatuses and control methods for balancing the duty cycles of high-side and low-side switches in LLC converters.

An LLC converter is one of the resonant converters, which typically offer smooth output waveforms, high conversion efficiency, and high output power. Generally, resonant converters convert a DC voltage into a sinusoidal voltage and this conversion can be achieved by providing a square-wave voltage to a resonant tank through a switch network. After filtering through the resonant tank, the fundamental component of the square-wave voltage is roughly retained to generate the sinusoidal voltage.

Due to soft switching and high conversion efficiency, LLC converters have been widely used in various applications, typically operated in voltage control mode. In voltage control mode, a compensation signal corresponding to a load on a secondary side can be generated on the primary side, and the ON times of high-side and low-side switches are determined by comparing the compensation signal with a triangular wave generated and determined internally inside a primary-side controller. The ON times of the high-side and low-side switches are generally balanced, or about the same. Nevertheless, this voltage control mode is well-known for its poor load transient response.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure, or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
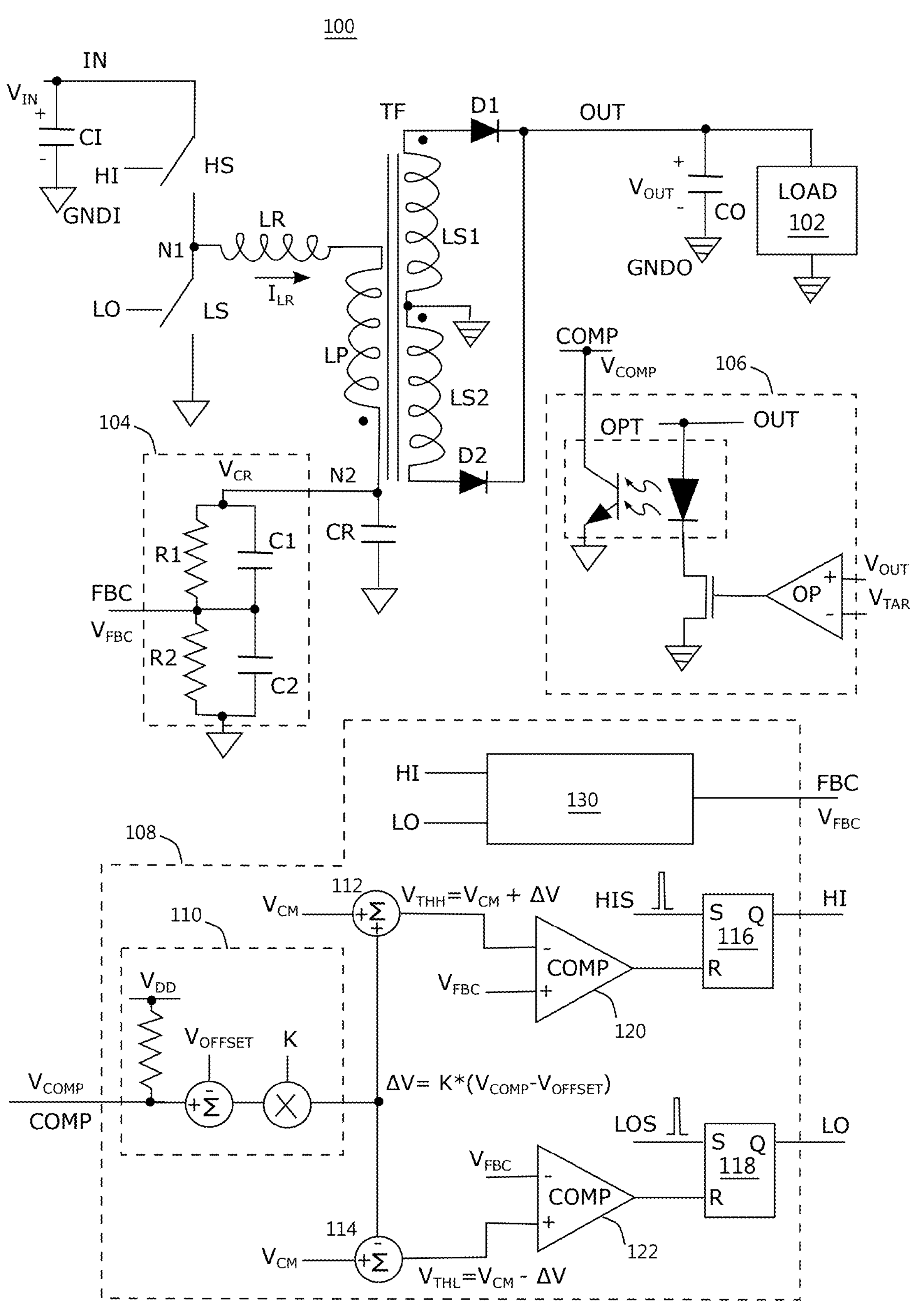
FIG. 1 illustrates LLC converter 100 implemented according to the present invention.

FIG. 1 illustrates LLC converter 100 implemented according to the present invention. LLC converter 100 converts input voltage $V_{IN}$ on the primary side into output voltage $V_{OUT}$ on the secondary side. LLC converter 100 operates in current control mode, capable of enabling better load transient response.

On the primary side, high-side switch HS and low-side switch LS, configured as a half bridge, are connected in series via node N1 between two input power lines, input power line IN and input ground line GNDI. Input capacitor CI serves as a filtering capacitor and is connected between input power line IN and input ground line GNDI to substantially stabilize input voltage $V_{IN}$. High-side switch HS and low-side switch LS are controlled by high-side control signal HI and low-side control signal LO, respectively.

Resonant inductor LR, primary winding LP, and resonant capacitor CR are connected in series between node N1 and input ground line GNDI, forming a resonant tank. In one embodiment, resonant inductor LR is not a discrete component but is a portion of primary winding LP that does not inductively couple to secondary windings LS1 and LS2, or, in other words, resonant inductor LR might represent the leakage inductance of primary winding LP. As shown in FIG. 1, resonant capacitor CR is connected to primary winding LP at node N2.

Voltage divider 104, connected between node N2 and input ground line GNDI, has feedback node FBC. Voltage signal $V_{CR}$ at node N2 can be divided by capacitors C1 and C2 connected in series in voltage divider 104, to generate feedback signal $V_{FBC}$ at feedback node FBC. Resistors R1 and R2, both connected to feedback node FBC, can be used to adjust common-mode voltage $V_{CMR}$ of feedback signal $V_{FBC}$, where common-mode voltage $V_{CMR}$ is about the average of feedback signal $V_{FBC}$ in one or several switching cycles.

High-side switch HS and low-side switch LS alternately turn ON and OFF to provide a square-wave voltage at node N1, causing the resonant tank to resonate. An alternating current ILR is generated on resonant inductor LR. Through the inductive coupling of transformer TF, induced voltages and currents are also generated on secondary windings LS1 and LS2. Diodes D1 and D2 on the secondary side provide full-wave rectification, and output capacitor CO provides low-pass filtering, to generate between output power line OUT and output ground line GNDO output voltage $V_{OUT}$, supplying power to load 102.

Compensation circuit 106 compares output voltage $V_{OUT}$ with target voltage $V_{TAR}$ and, through the help of optocoupler OPT, generates compensation signal $V_{COMP}$ at compensation node COMP on the primary side.

On the primary side, power controller 108 generates high-side control signal HI and low-side control signal LO based on compensation signal $V_{COMP}$ and feedback signal $V_{FBC}$. Level-shifting and scaling apparatus 110 offsets compensation signal $V_{COMP}$ using an adder and proportionally changes its value using a multiplier to generate delta voltage $\Delta V$, which is equal to $K*(V_{COMP}-V_{OFFSET})$, Where K is a preset value and $V_{OFFSET}$ is a preset voltage. Adders 112 and 114 respectively generate the thresholds $V_{THH}$ and $V_{THL}$, where threshold $V_{THH}$ is common voltage $V_{CM}$ plus delta voltage $\Delta V$, and threshold voltage $V_{THL}$ is common voltage $V_{CM}$ minus delta voltage $\Delta V$. Common voltage $V_{CM}$ is always the average of thresholds $V_{THH}$ and $V_{THL}$.

Figure 2A:
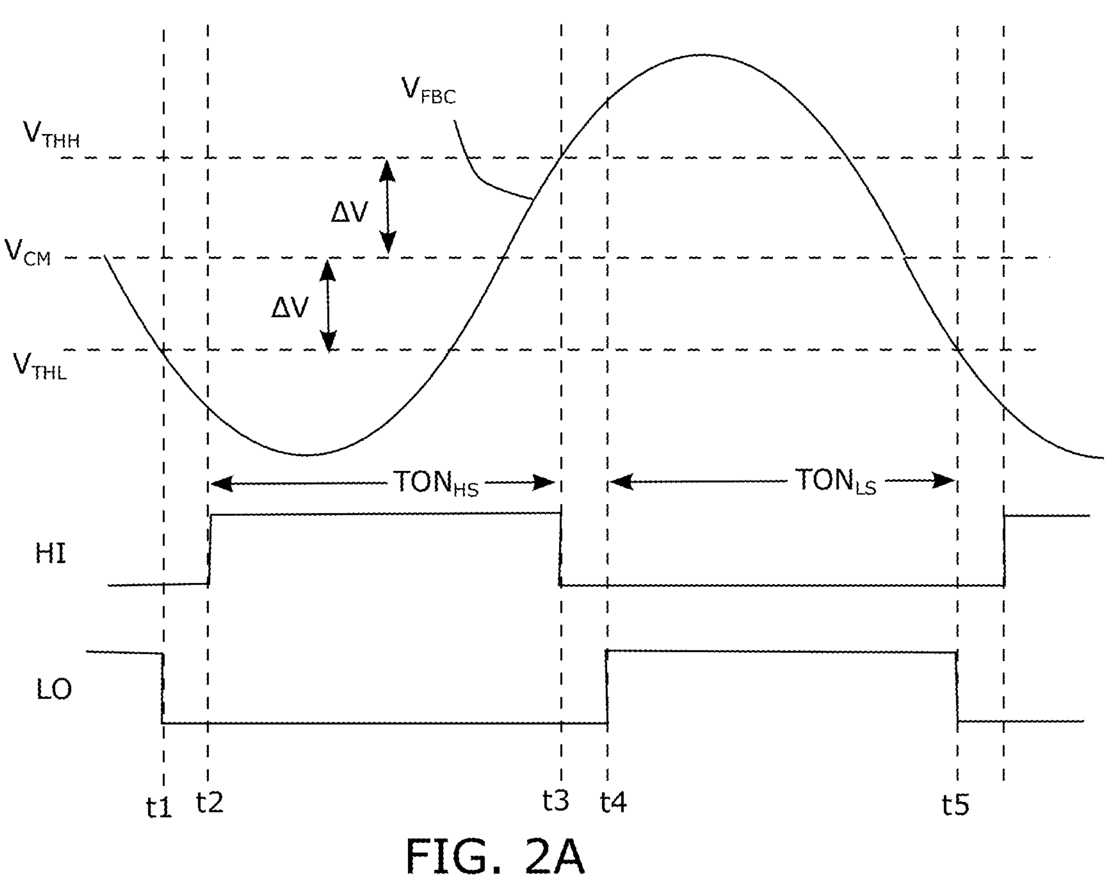
FIG. 2A shows the waveforms of feedback signal $V_{FBC}$, high-side control signal HI, and low-side control signal LO when the duty cycles of high-side switch HS and low-side switch LS are balanced.

Refer to FIGS. 2A and 1, where FIG. 2A shows the waveforms of feedback signal $V_{FBC}$, high-side control signal HI, and low-side control signal LO when the duty cycles of high-side switch HS and low-side switch LS are balanced. FIG. 2A also illustrates common voltage $V_{CM}$, delta voltage $\Delta V$, and thresholds $V_{THH}$ and $V_{THL}$.

In FIG. 2A, the period from moment t1 to moment t2 is a dead time, during which both high-side switch HS and low-side switch LS are OFF. This dead time can be a fixed duration or ended by detecting whether the voltage at node N1 is high enough to allow high-side switch HS to achieve soft switching. Therefore, high-side initiation signal HIS in FIG. 1 sets flip-flop 116 at moment t2, to make high-side control signal HI "1" in logic and to start turning ON high-side switch HS.

Comparator 120 compares feedback signal $V_{FBC}$ with threshold voltage $V_{THH}$. Comparator 120 and SR flip-flop 116 in FIG. 1 are configured to turn OFF high-side switch HS by making high-side control signal HI "0" in logic when feedback signal $V_{FBC}$ exceeds threshold voltage $V_{THH}$, as shown at moment t3 in FIG. 2A, ending ON time $TON_{HS}$ (from moment t2 to moment t3) during which high-side switch HS is ON.

The period from moment t3 to moment t4 in FIG. 2A is another dead time. Similarly, this dead time can be a fixed duration or ended by detecting whether the voltage at node N1 is low enough to enable soft switching for low-side switch LS. At moment t4 in FIG. 2A, low-side initiation signal LOS in FIG. 1 sets SR flip-flop 118, to make low-side control signal LO "1" in logic and to start turning ON low-side switch LS.

Comparator 122 compares feedback signal $V_{FBC}$ with threshold voltage $V_{THL}$. Comparator 122 and SR flip-flop 118 in FIG. 1 are configured to turn OFF low-side switch LS by making low-side control signal LO "0" in logic when feedback signal $V_{FBC}$ drops below threshold voltage $V_{THL}$, as shown at moment t5 in FIG. 2A, ending ON time $TON_{LS}$ (from moment t4 to moment t5), during which low-side switch LS is ON.

In FIG. 2A, in terms of duration, ON time $TON_{LS}$ is approximately equal to ON time $TON_{HS}$. This balances the duty cycles of high and low-side switches HS and LS, maximizing the working time and efficiency of them both.

In FIG. 1, common-mode-voltage modifier 130 can adjust common-mode voltage $V_{CMR}$ of feedback signal $V_{FBC}$ based on control signals HI and LO. When the duty cycles of high-side and low-side switches (HS and LS) are unbalanced, common-mode-voltage modifier 130 can adjust common-mode voltage $V_{CMR}$, effectively shifting feedback signal $V_{FBC}$ to balance the duty cycles of high-side and low-side switches.

Figure 3:
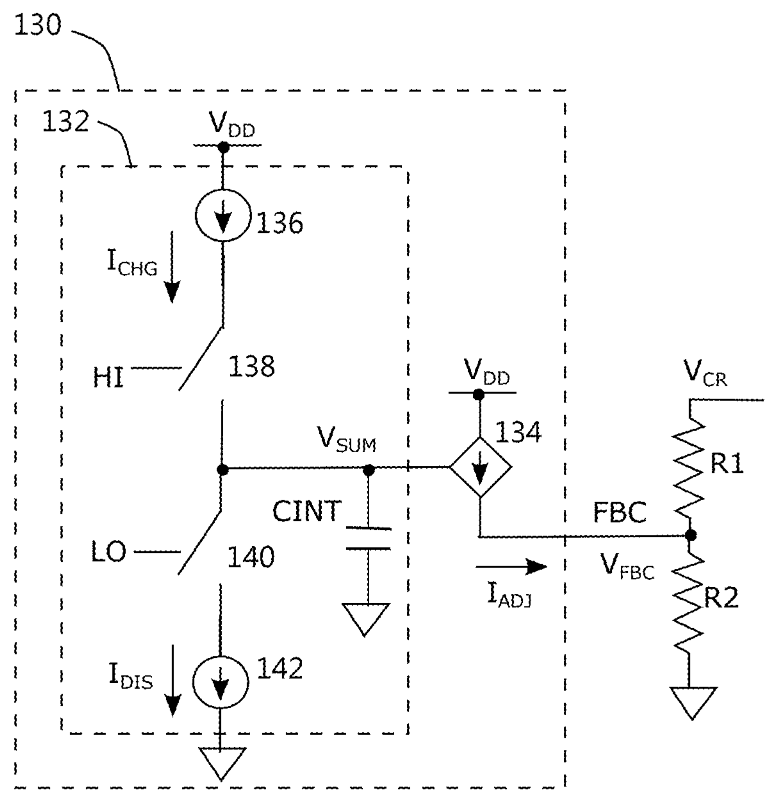
FIG. 3 illustrates common-mode-voltage modifier 130 depicted in FIG. 1.

FIG. 3 illustrates common-mode-voltage modifier 130 depicted in FIG. 1. Duty-cycle comparator 132 includes constant current sources 136 and 142, switches 138 and 140, and capacitor CINT. Constant current sources 136 and 142 provide currents $I_{CHG}$ and $I_{DIS}$ with the same amplitude, respectively, for charging and discharging capacitor $C_{INT}$. Since switches 138 and 140 are controlled by high-side control signal HI and low-side control signal LO, respectively, constant current source 136 charges capacitor CINT based on the duty cycle of high-side switch HS, while constant current source 142 discharges capacitor CINT based on the duty cycle of low-side switch LS. Duty-cycle comparator 132 compares the duty cycle of high-side switch HS and that of the low-side switch LS, and accumulates the difference between the duty cycles of high-side switch HS and low-side switch LS on capacitor CINT, generating accumulated signal $V_{SUM}$. Accumulated signal $V_{SUM}$ controls voltage-controllable current source 134 to provide adjustment current $I_{ADJ}$, which equivalently flows through a parallel circuit consisting of resistors R1 and R2 and accordingly shifts common-mode voltage $V_{CMR}$ of feedback signal $V_{FBC}$.

Figure 2B:
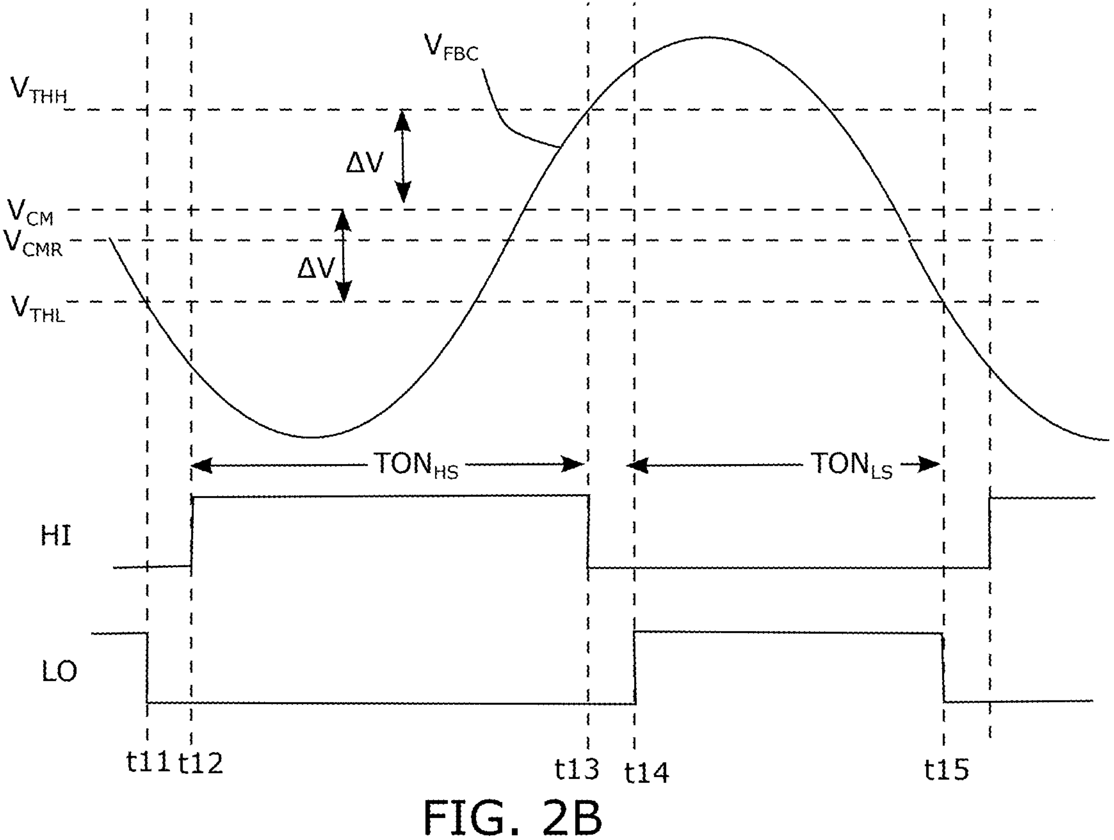
FIG. 2B illustrates the signal waveforms of feedback signal $V_{FBC}$, control signal HI, and control signal LO when duty cycles of high-side switch HS and low-side switch LS are unbalanced.

FIG. 2B signal illustrates the waveforms of feedback signal $V_{FBC}$, control signal HI, and control signal LO when duty cycles of high-side switch HS and low-side switch LS are unbalanced. The same or similarities between FIGS. 2A and 2B can be inferred from the previous explanation of FIG. 2A and are not reiterated here.

In comparison to FIG. 2A, feedback signal $V_{FBC}$ in FIG. 2B has a lower common-mode voltage $V_{CMR}$ for some reasons, noticeably lower than common voltage $V_{CM}$, where common-mode voltage $V_{CMR}$ about the average of feedback signal $V_{FBC}$. Therefore, in FIG. 2B, ON time $TON_{HS}$ of high-side switch HS (from time t12 to t13) is significantly greater than ON time $TON_{LS}$ of low-side switch LS (from time t14 to t15), indicating that the duty cycle of high-side switch HS is greater than the duty cycle of low-side switch LS, or that the duty cycles of high-side switch HS and low-side switch LS are unbalanced. From common-mode-voltage modifier 130 in FIG. 3, it can be inferred that after the switching cycle in FIG. 2B, accumulated signal $V_{SUM}$ and adjustment current $I_{ADJ}$ as well will increase, raising common-mode voltage $V_{CMR}$ in the following switching cycles. As a result, the duty cycle of high-side switch HS will decrease and that of low-side switch LS increase in the following switching cycles. Consequently, the duty cycles of high-side switch HS and low-side switch LS will gradually become balanced or equal.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An LLC converter, comprising;

high-side and low-side switches connected in series between two input power lines via a first node;

a resonant circuit connected to the first node, comprising a primary winding of a transformer and a resonant capacitor both connected to a second node;

a voltage divider coupled to the second node to provide a feedback signal at a feedback node;

a power controller, in response to the feedback signal, providing high-side and low-side control signals to control the high-side and low-side switches respectively, the power controller comprising:

a duty-cycle comparator, comparing a first duty cycle of the high-side control signal and a second duty cycle of the low-side control signal and providing an accumulation signal based on a difference between the first and second duty cycles; and a controllable current source, in response to the accumulation signal, providing an adjustment current to adjust an average of the feedback signal.

2. The LLC converter of claim 1, wherein the power controller compares the feedback signal with a first threshold to turn OFF the high-side switch, and the feedback signal with a second threshold to turn OFF the low-side switch.

3. The LLC converter of claim 2, wherein the first and second thresholds are generated in response to a compensation signal and a common voltage, the common voltage is the average of the first and second thresholds, and the compensation is controlled by an output voltage of the LLC converter.

4. The LLC converter of claim 1, wherein the duty-cycle comparator comprises:

a first capacitor providing the accumulation signal;

a first constant current source charging the first capacitor based on the first duty cycle; and a second constant current source discharging the first capacitor based on the second duty cycle;

wherein the first and second constant current sources provide currents with the same amplitude.

5. The LLC converter of claim 1, wherein the voltage divider comprises first and second resistors, and first and second capacitors connected between the second node and one of the two input power lines, and the feedback node connects the first and second resistors, and the first and second capacitors.

6. A control method in use of an LLC converter, comprising:

providing high-side and low-side switches connected in series between two input power lines via a first node, wherein connected to the first node is a resonant circuit with a primary winding of a transformer and a resonant capacitor both connected to a second node, and a voltage divider is connected to the second node to generate a feedback signal at a feedback node;

generating first and second control signals to control the high-side and low-side switches respectively in response to the feedback signal and a compensation signal controlled by an output voltage of the LLC converter;

comparing a first duty cycle of the first control signal with a second duty cycle of the second control signal to provide an accumulation signal; and providing an adjustment current in response to the accumulation signal to adjust an average of the feedback signal.

7. The control method of claim 6, comprising:

comparing a first threshold with the feedback signal to turn off the high-side switch; and comparing a second threshold with the feedback signal to turn off the low-side switch;

wherein the first and second thresholds are generated in response to a common voltage and the compensation signal.

8. The control method of claim 7, wherein the common voltage is about the average of the first and second thresholds.

9. The control method of claim 6, comprising:

providing a first constant current to charge a capacitor in response to the first duty cycle; and providing a second constant current to discharge the capacitor in response to the second duty cycle;

wherein the first and second constant current are of the same amplitude, and the capacitor provides the accumulation signal.

10. The control method of claim 6, wherein the voltage divider comprises first and second resistors, and first and second capacitors connected between the second node and one of the two input power lines, and the feedback node connects the first and second resistors, and the first and second capacitors.

11. A common-voltage modifier in use of an LLC converter, comprising:

a duty-cycle comparator for comparing a first duty cycle of a high-side switch and a second duty cycle of a low-side switch to provide an accumulated signal, wherein the high-side and low-side switches connected in series between two input power lines via a first node; and a voltage-controllable current source for providing, in response to the accumulated signal, an adjustment current to shift an average of a feedback signal;

wherein the high-side and low-side switches are controlled in response to the feedback signal and a compensation signal to provide a square-wave voltage to a resonant tank, a voltage divider is connected between the resonant tank and one of the input power lines to provide the feedback signal, and the compensation signal is controlled by an output voltage of the LLC converter.

12. The common-voltage modifier of claim 11, wherein the duty-cycle comparator comprises:

a capacitor for providing the accumulated signal;

a first constant current source providing a first current to charge the capacitor in response to the first duty cycle; and a second constant current source providing a second current to discharge the capacitor in response to the second duty cycle.

13. The common-voltage modifier of claim 11, wherein the voltage divider comprises two capacitors connected in series to provide the feedback signal at a feedback node connected to both the capacitors.

14. The common-voltage modifier of claim 11, wherein the voltage divider comprises two resistors both connected to the feedback node.

15. The common-voltage modifier of claim 14, wherein the adjustment current is provided to the feedback node.

* * * * *